US00RE48193E

(19) United States
(12) Reissued Patent
Cho

(10) Patent Number: US RE48,193 E
(45) Date of Reissued Patent: Sep. 1, 2020

(54) NO POINT OF CONTACT CHARGING SYSTEM

(71) Applicant: Hanrim Postech Co., Ltd., Suwon-si, Gyeonggi-do (KR)

(72) Inventor: Ki-Young Cho, Gunpo-si (KR)

(73) Assignee: GE HYBRID TECHNOLOGIES, LLC, Niskayuna, NY (US)

(21) Appl. No.: 13/750,494

(22) Filed: Jan. 25, 2013

(65) Prior Publication Data

US 2013/0154559 A1 Jun. 20, 2013

Related U.S. Patent Documents

Reissue of:
(64) Patent No.: 7,443,135
Issued: Oct. 28, 2008
Appl. No.: 10/570,041
PCT Filed: Apr. 11, 2005
PCT No.: PCT/KR2005/001037
§ 371 (c)(1),
(2) Date: Feb. 9, 2006
PCT Pub. No.: WO2006/101285
PCT Pub. Date: Sep. 28, 2006

U.S. Applications:
(63) Continuation of application No. 12/914,303, filed on Oct. 28, 2010, now Pat. No. Re. 44,038, which is an application for the reissue of Pat. No. 7,443,135.

(30) Foreign Application Priority Data

Mar. 21, 2005 (KR) ..... 10-2005-0023184

(51) Int. Cl.
*H02J 7/00* (2006.01)
*H02J 50/60* (2016.01)
(Continued)

(52) U.S. Cl.
CPC ..... *H02J 7/00* (2013.01); *H02J 7/025* (2013.01); *H02J 50/12* (2016.02); *H02J 50/60* (2016.02); *H01F 38/14* (2013.01); *H02J 50/80* (2016.02)

(58) Field of Classification Search
CPC ..... H02J 2001/106; H02J 1/102; H02J 7/00; H02J 7/0006; H02J 7/0008; H02J 7/0016;
(Continued)

(56) References Cited

U.S. PATENT DOCUMENTS 5,568,036 A 10/1996 Hulsey et al. ..... 320/108
5,963,012 A 10/1999 Garcia et al. ..... 320/106
(Continued)

FOREIGN PATENT DOCUMENTS

DE 101 58 794 A1 11/2001
EM 1 432 097 6/2004
(Continued)

OTHER PUBLICATIONS

European Search Report issued by the European Patent Office on Apr. 17, 2014 for the corresponding EP Application No. 11 178 723.0.

(Continued)

*Primary Examiner* — Samuel G Rimell
(74) *Attorney, Agent, or Firm* — DeLizio Law, PLLC

(57) ABSTRACT

Disclosed herein is a non-contact charging system. The non-contact charging system detects a portable terminal, a battery pack or a foreign object that is placed on the pad of a non-contact charger, and effectively monitors and controls its charging state through the detection, thus preventing such a foreign object placed on the pad from being heated by induction heating, and further causes anions to be generated during the charging of the portable terminal or the battery
(Continued)

[Amended]

pack, thus sterilizing bacteria on a terminal and keeping ambient air thereof fresh.

11 Claims, 6 Drawing Sheets

(51) Int. Cl.

| | |
|---|---|
| ***H02J 7/02*** | (2016.01) |
| ***H02J 50/12*** | (2016.01) |
| *H02J 50/80* | (2016.01) |
| *H01F 38/14* | (2006.01) |

(58) Field of Classification Search
CPC .. H02J 7/0019; H02J 7/025; H02J 7/02; H02J 50/60; H02J 50/12; H02J 50/80; H01F 2017/0073; H01F 17/0006; H01F 38/00; H01F 38/14
See application file for complete search history.

(56) References Cited

U.S. PATENT DOCUMENTS

| | | | | |
|---|---|---|---|---|
| 6,118,249 | A * | 9/2000 | Brockmann et al. | H02J 7/025 |
| 6,683,438 | B2 * | 1/2004 | Park et al. | H02J 7/025 |
| 6,909,495 | B2 | 6/2005 | Huston et al. | 320/108 |
| 7,042,196 | B2 | 5/2006 | Ka-Lai et al. | 320/108 |
| 7,239,110 | B2 | 7/2007 | Cheng et al. | 320/108 |
| 7,443,135 | B2 | 10/2008 | Cho | |
| 8,030,887 | B2 * | 10/2011 | Jung | H02J 7/025 |
| RE44,038 | E | 3/2013 | Cho | |
| 2003/0001543 | A1 | 1/2003 | Eisenbraun | 320/162 |
| 2003/0151930 | A1 | 8/2003 | Berghegger | 363/21.02 |
| 2005/0116683 | A1 | 6/2005 | Cheng et al. | 320/108 |
| 2005/0189910 | A1 * | 9/2005 | Hui | H01F 17//0006 |
| 2008/0094027 | A1 | 4/2008 | Cho | |
| 2012/0326514 | A1 * | 12/2012 | Kim et al. | H02J 9/0005 |

FOREIGN PATENT DOCUMENTS

| | | | |
|---|---|---|---|
| GB | 2388716 | A | 11/2003 |
| JP | 04-067732 | | 3/1992 |
| JP | H04067732 | A | 3/1992 |
| JP | 09-013037 | | 4/1997 |
| JP | 09103037 | A | 4/1997 |
| JP | 2002-209344 | | 7/2002 |
| JP | 2002209344 | A | 7/2002 |
| JP | 2002-272020 | | 9/2002 |
| JP | 2002272020 | A | 9/2002 |
| KR | 10-2002-0035242 | | 5/2002 |
| KR | 1020020035242 | A | 5/2002 |
| KR | 10-2002-0057469 | | 7/2002 |
| KR | 1020020057469 | A | 7/2002 |
| KR | 20-0361755 | Y1 | 9/2004 |
| KR | 10-2005-0122669 | | 12/2005 |
| KR | 1020050122669 | A | 12/2005 |
| WO | 2006-001557 | | 1/2006 |

OTHER PUBLICATIONS

Reference (AA) U.S. 2003/0151930 A1 above, is substantially equivalent to (AB) DE 101 58 794 A1.
U.S. Appl. No. 12/914,303, filed Oct. 2010, Cho.
"European Application No. 05804905.7 Communication pursuant to Article 94(3) EPC", Dec. 20, 2010, 11 pages.
"European Application No. 05804905.7 Communication pursuant to Article 94(3) EPC", Feb. 25, 2014, 5 pages.
"European Application No. 05804905.7 Supplementary Search Report", Jul. 9, 2010, 3 pages.
"European Application No. 19159706.1 European Search Report and Opinion", Jun. 27, 2019, 7 pages.
"European Application No. 11178723.0 Communication pursuant to Article 94(3) EPC", Jun. 24, 2019, 8 pages.
"PCT Application No. PCT/KR2005/001037 International Preliminary Report on Patentability", Sep. 5, 2007, 4 pages.
"PCT Application No. PCT/KR2005/001037 Written Opinion", Nov. 18, 2005, 3 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 12/914,303 Office Action", dated Sep. 16, 2011, 4 pages.
European Patent Office Application No. 05 804 905.7, Office Action dated Jan. 20, 2017, 9 pages.

* cited by examiner

[Amended Fig. 1]
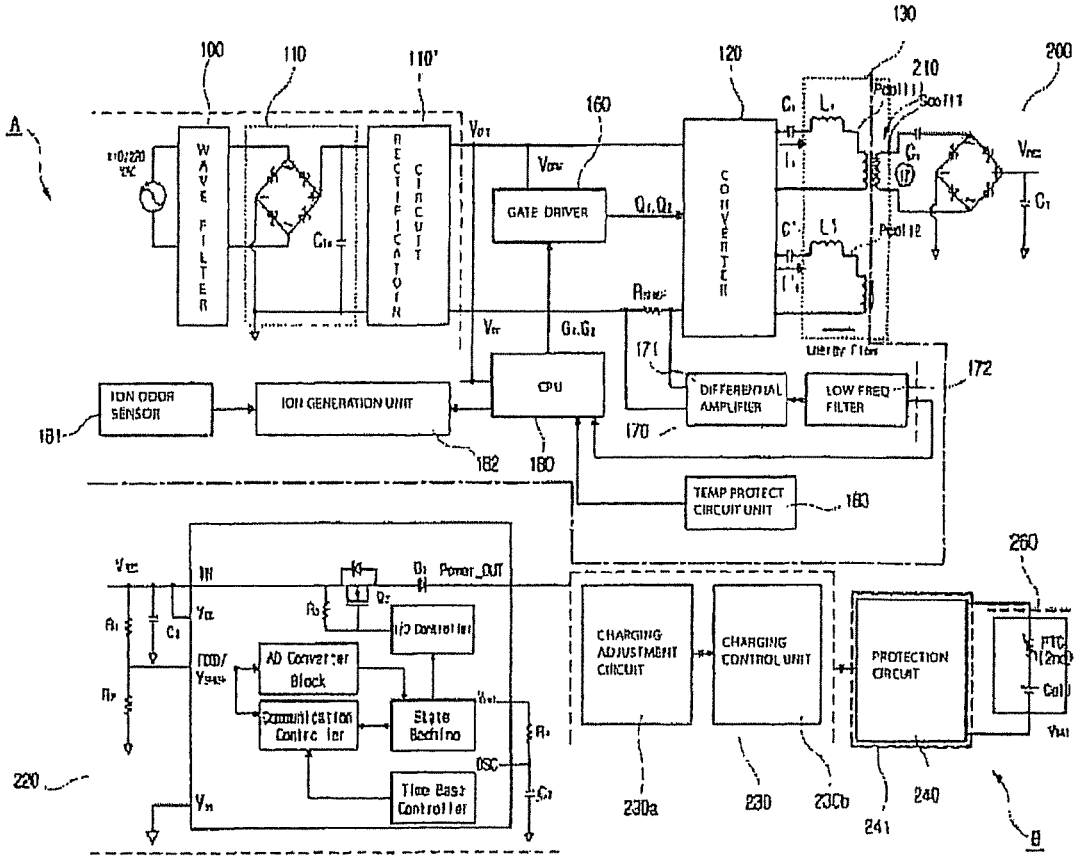
[Fig. 2]
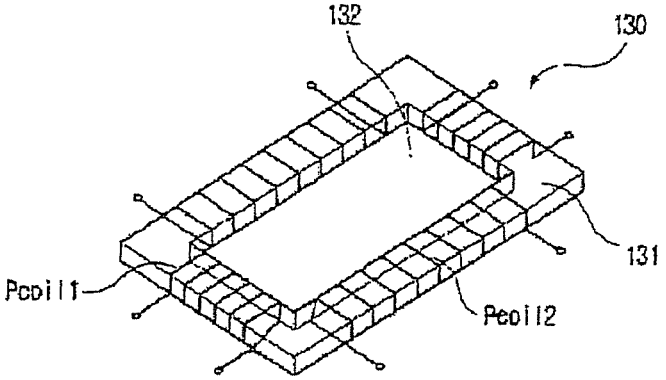

[Fig. 3]
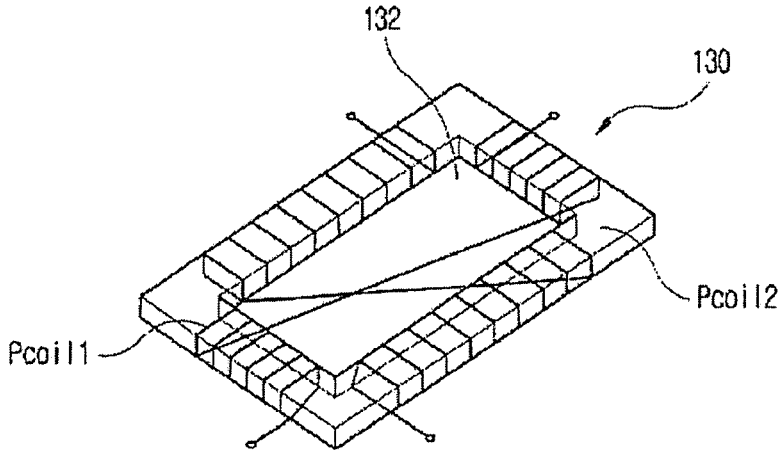
[Fig. 4]
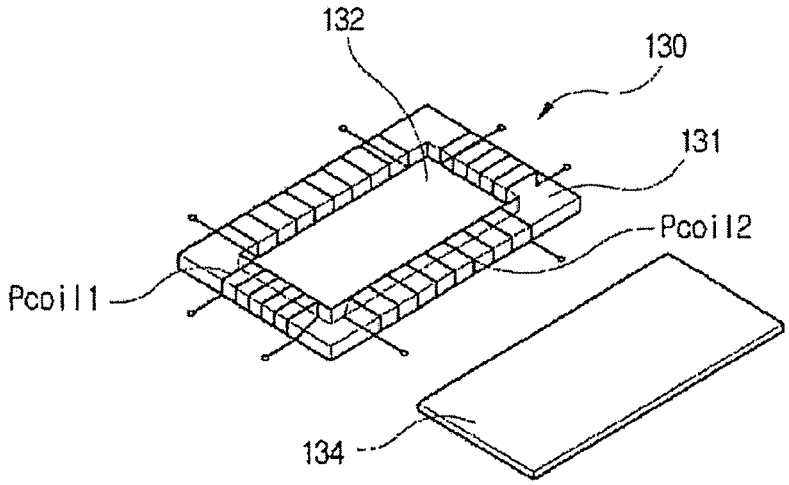
[Fig. 5]
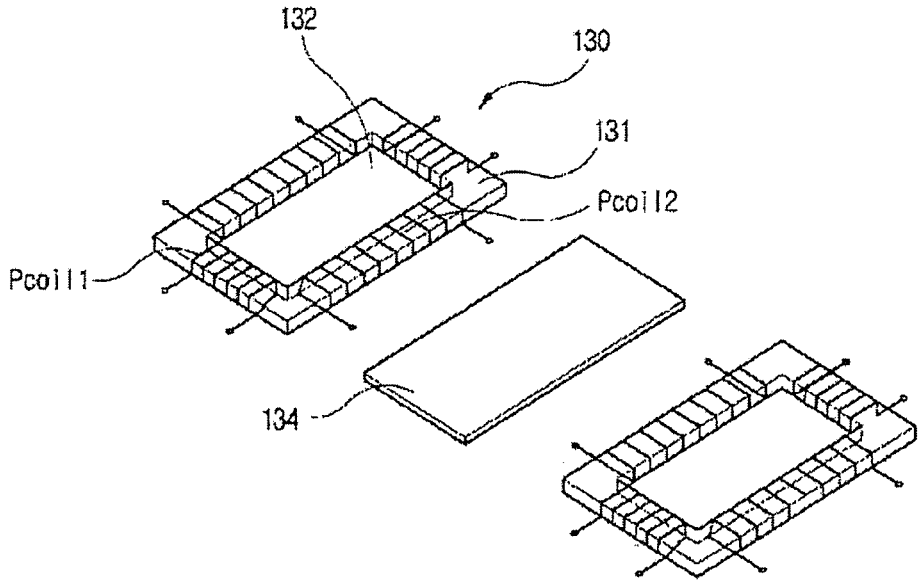

[Fig. 6]
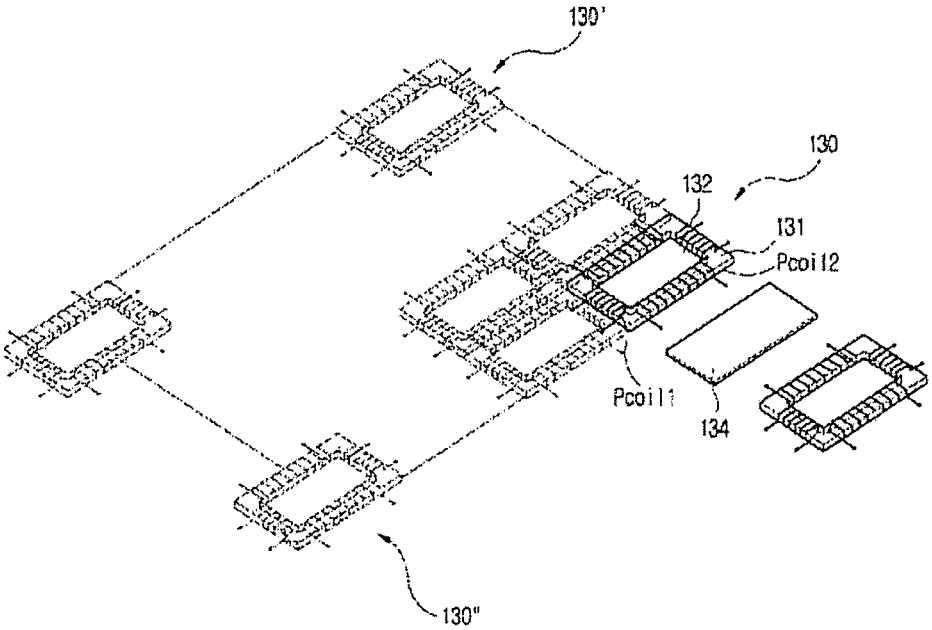
[Fig. 7]
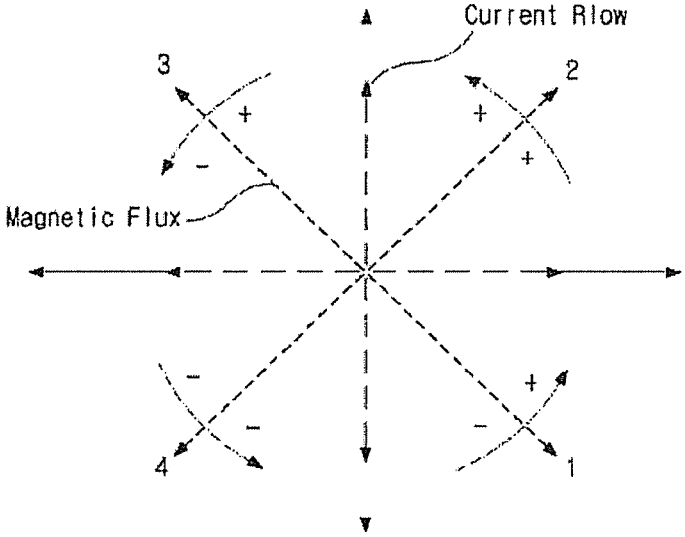
[Fig. 8]
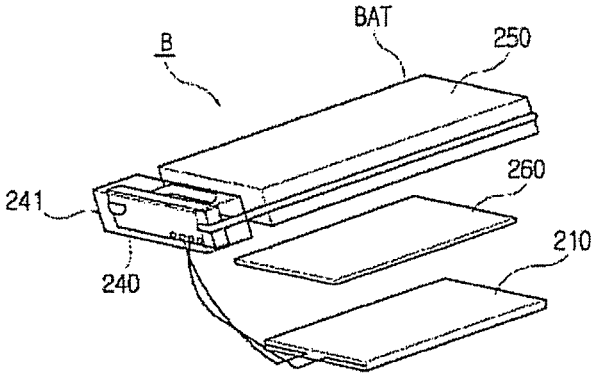

[Amended Fig. 9]
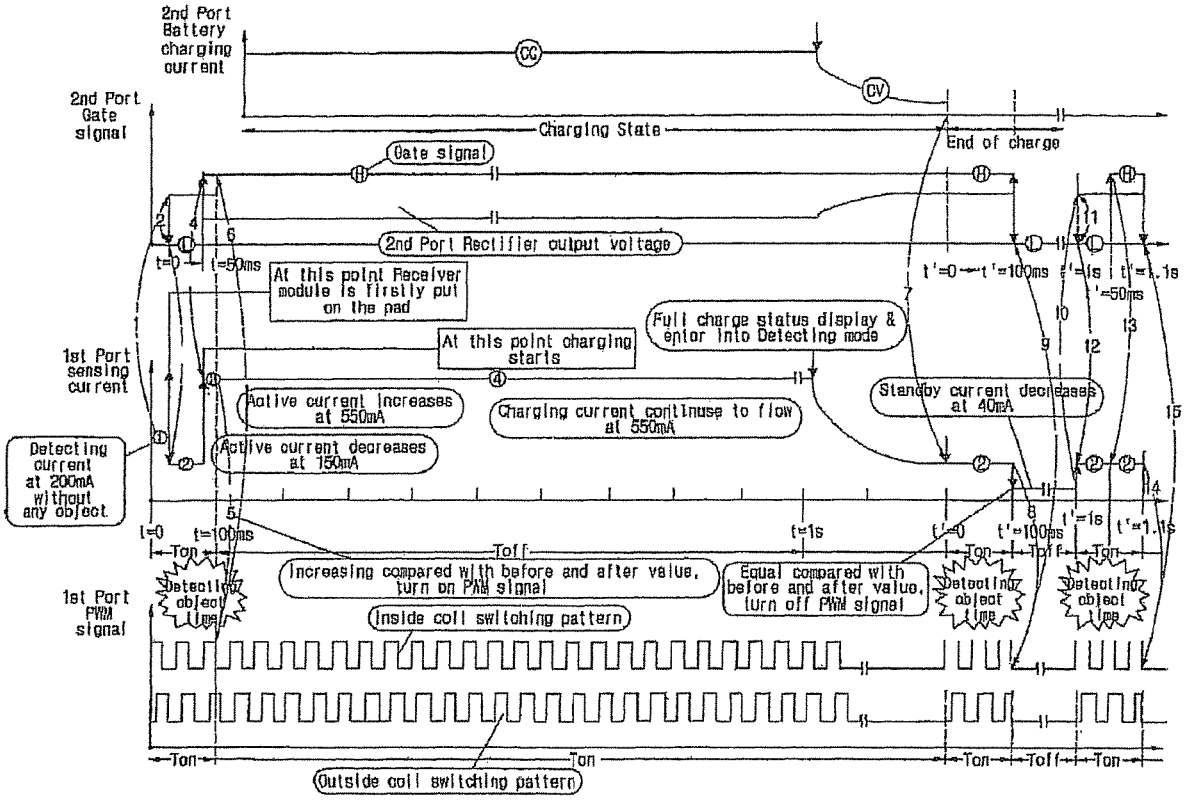

[Amended Fig. 10]
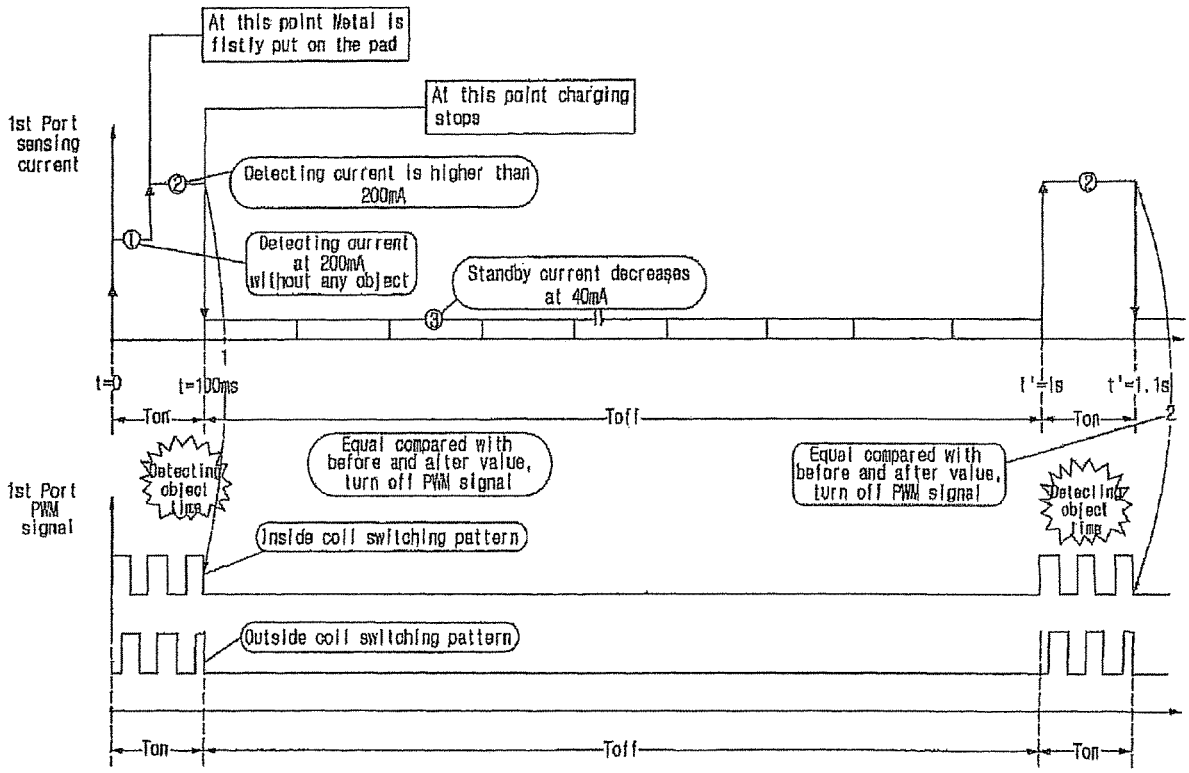

[Fig. 11]
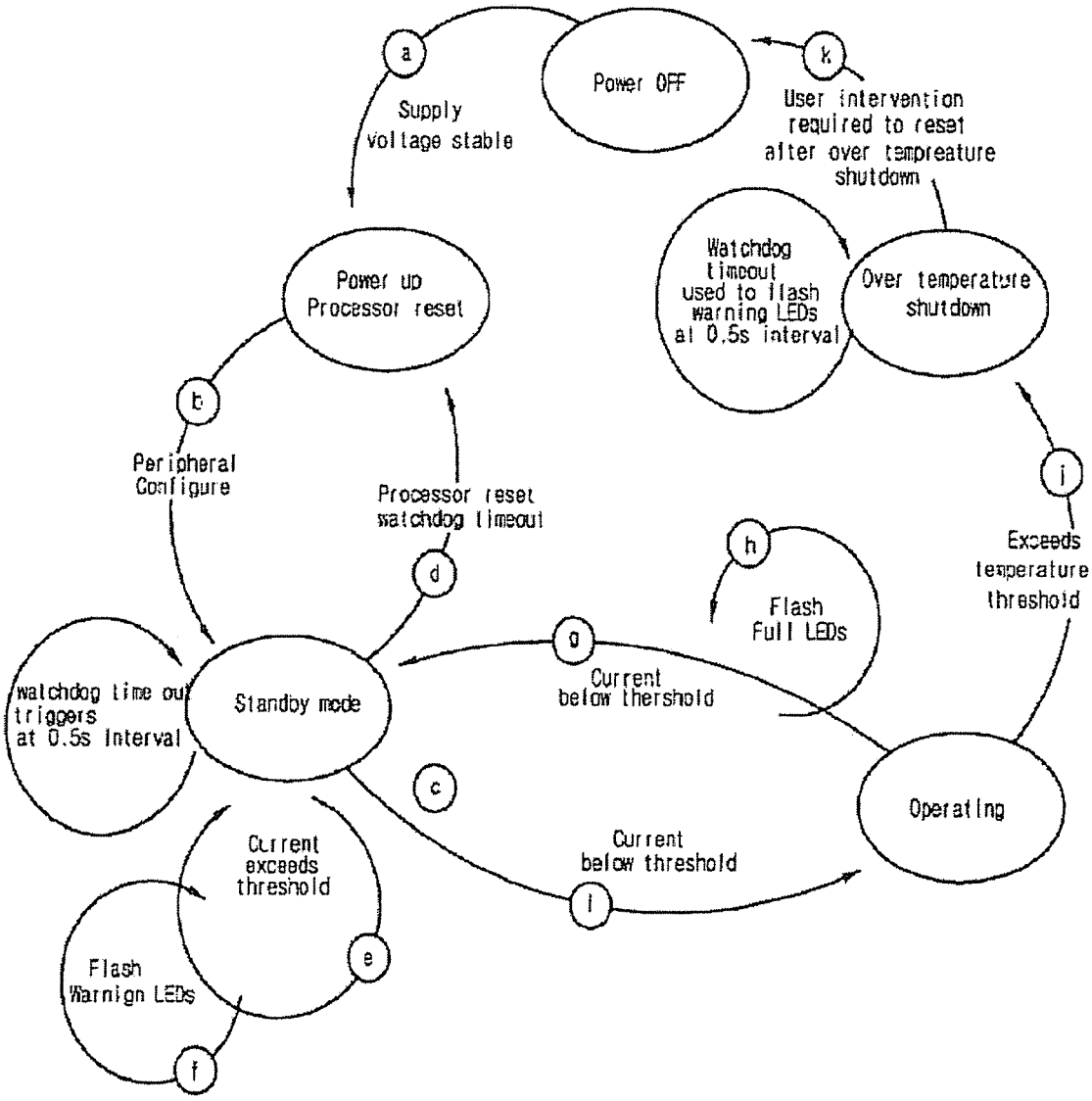

NO POINT OF CONTACT CHARGING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 7,443,135. The reissue applications are U.S. patent application Ser. No. 12/914,303, filed Oct. 28, 2010, and U.S. patent application Ser. No. 13/750,494 (the present application), filed Jan. 25, 2013.*

*The present application is a reissue application of U.S. patent application Ser. No. 10/570,041, issued as U.S. Pat. No. 7,443,135 on Oct. 28, 2008, which is a national stage application of International Application PCT/KR2005/001037, filed Apr. 11, 2005, which claims the benefit of priority to Korean Application No. 10-2005-0023184, filed Mar. 21, 2005 in the Korean Intellectual Property Office, and the present application is also a continuation of U.S. application Ser. No. 12/914,303, filed Oct. 28, 2010, which is a reissue application of U.S. Pat. No. 7,443,135 and issued as Reissue U.S. Pat. No. 44,038 on Mar. 5, 2013, which claims the benefit of priority to Korean Application No. 10-2005-0023184, filed Mar. 21, 2005 in the Korean Intellectual Property Office.*

TECHNICAL FIELD

The present invention relates, in general, to a no point of contact charging system and, more particularly, to a no point of contact charging system, which detects a portable terminal, a battery pack or a foreign object that is placed on the pad of a non-contact charger, and effectively monitors and controls its charging state through the detection, thus preventing such a foreign object placed on the pad, from being heated by induction heating, and which causes anions to be generated during the charging of the portable terminal or the battery pack, thus destroying bacteria on a terminal and keeping nearby ambient air fresh.

BACKGROUND ART

Generally, as communication and information processing technology are developed, the use of portable devices, such as mobile phones, that are convenient to carry is gradually increasing. With the development of technology, there is a trend in which new model terminals, the efficiency of which is improved, are being frequently popularized.

For the charging of such a portable device, a contact type charging scheme, or a non-contact charging scheme, which charges a battery using magnetic coupling without electrical contact, in order to solve the problems of the contact type charging scheme that result form the exposure of the contact terminals to the outside, is being used.

In relation to technology corresponding to such a non-contact charger, a scheme that performs charging by wireless communication between a battery pack and a charging device using a magnetic body core, such as unexamined Korean Pat. No. 2002-0035242 previously filed, entitled "Contactless Type Charging Device Of Storage Battery For Mobile Device Using Induction Coupling," and a scheme that solves the problem of the magnetic body core using a transformer in which a wire is formed on a printed circuit substrate, such as previously filed unexamined Korean Pat. No. 2002-0057469, entitled "Coreless Ultra Thin Type Printed Circuit Substrate Transformer And Non-contact Battery Charger Using Printed Circuit Substrate Transformer," have been proposed.

The present applicant proposed technology that constructs a wireless charging pad for performing a non-contact charging function, is configured such that the battery pack of a portable device is placed on the wireless charging pad for performing a non-contact charging function and, therefore, allows non-contact charging to be performed through "Wireless Charging Pad And Battery Pack Employing Radio Frequency Identification Technology (previously filed Korean Appl. No. 2004-48286)."

However, when detecting the portable device or the battery pack placed on the non-contact charging pad, the conventional technology depends on a scheme for transmitting Radio Frequency (RF) carrier signals to the outside through a reader antenna, and then detecting whether return signals exist, so that it is problematic in that the detection of the battery pack and the monitoring and controlling of the charging state through the detection are limitedly performed.

Furthermore, in the case in which a coin, a metal pen, a pair of scissors or the like (hereinafter referred to as a foreign object), other than the battery pack or the portable device, are placed on the non-contact charging pad, power transmission is continuously performed, so that a problem occurs in that the foreign object placed on the non-contact charging pad is heated by induction heating.

Furthermore, the non-contact charging pad only has a function of charging terminals or battery packs, so that a problem occurs in that the efficiency thereof is lowered.

DISCLOSURE

Technical Problem

Accordingly, the present invention has been made keeping in mind the above problems occurring in the prior art, and an object of the present invention is to provide a non-contact charging system that detects a portable terminal, a battery pack or a foreign object placed on a non-contact charging pad according to a type, and monitors and controls its charging state through the detection, thus preventing such a foreign object placed on the pad from being heated to high temperature.

Another object of the present invention is to provide a non-contact charging system, in which a function of sterilizing a terminal is provided to a non-contact charging pad and causes anions to be generated therefrom, thus enabling sanitary use of the terminal and keeping ambient air nearby thereof fresh.

A further object of the present invention is to provide a non-contact charging system, in which a primary core unit included in a non-contact charging pad is provided in a form such that the center portion thereof may be passed through, so that the structure thereof is simplified, charging is available at a defined location and, therefore, the usage efficiency thereof can be increased.

Technical Solution

In order to accomplish the above objects, the present invention provides a non-contact charging system having a battery pack (B) charged by an induced electromotive force generated from a non-contact charger (A) supplied with power, wherein the non-contact charger (A) includes an electromagnetic wave filter (100) connected to a power input terminal to block electromagnetic waves caused by Alternating Current (AC) power; a primary rectification circuit (110) for rectifying the AC power, the electromagnetic waves of which are blocked, to Direct Current (DC) power; a flyback converter (110') for storing power transferred from the primary rectification circuit (110) while a contained transistor is turned on, and applying an input voltage to a gate driver (160), a central processing unit (180) and an ion generation unit (182) and applying a driving voltage to a series resonance type converter (120) when the contained transistor is turned off; a current detection unit (170) interposed between the flyback converter (110') and the series resonance type converter (120) to detect variation in current resulting from the approach of the battery pack (B), and outputting a comparison current depending on variation in current; a central processing unit (180) for detecting the approach of the battery pack (B) using the comparison current input from the current detection unit (170), controlling the gate drive (160) according not only to whether the battery pack (B) approaches but also to the current of a temperature protection circuit unit (183) to stop the switching of the gate drive (160) when abnormal operation occurs or a temperature of a foreign object placed on the non-contact charging pad exceeds a predetermined temperature; a gate driver (160) for outputting gate signals under control of the central processing unit (180); the series resonance type converter (120) for adjusting the waveforms of voltage and current applied to a primary core unit (130) in response to the gate signals input from the gate driver (160); and the primary core unit (130) switched by the series resonance type converter (120) to generate the induced electromotive force.

The gate driver (160) allows two switching devices, which are provided in the series resonance type converter (120), to be alternately turned on in response to the gate signals output under the control of the central processing unit (180), thus adjusting the waveforms of the input voltage and current through charging and discharging parallel capacitors coupled to respective switching devices.

The current detection unit (170) is connected to both ends of a resistor connected to an output terminal of the flyback converter (110') and an input terminal of the series resonance type converter (120), includes a differential amplifier (171) to which signals output from both ends of the resistor are input, and a comparator/low frequency filter (172) which is coupled to an output terminal of the differential amplifier (171), and detects variation in current by comparing the output voltage of the differential amplifier (171) with a predetermined reference voltage, filters out a comparison current depending on variation in current, and outputs the comparison current.

The central processing unit (180) is configured to process information fed back from a dust and odor sensor (181) and switch the operation mode of the ion generation unit (182).

The primary core unit (130) is configured such that coils (Pcoil1 and Pcoil2) are wound around a plate core member (131) in which a central opening (132) is formed.

The plate core member (131) is formed in a polygonal shape, a circular shape, or elliptical shape, and is configured such that pieces of amorphous metal or ferrite material are attached thereto.

The coils (Pcoil1 and Pcoil2) are wound around the plate core member (131) in series or in parallel.

The battery pack (B) includes a secondary core unit (210) configured to induce power through the primary core unit (130); a secondary rectification circuit unit (200) coupled to the coil (Scoil1) of the secondary core unit (120) to rectify the induced power; a charging control unit (230) comprising a charging adjustment circuit (230a) for supplying a fuel gauge (230b) with power rectified by the secondary rectification circuit (200), and applying voltage to a Radio Frequency Identification (RFID) control unit in response to the output of the secondary rectification circuit 200, and the fuel gauge (210b) for supplying a battery BAT through a protection circuit (240) with power supplied from the charging adjustment circuit (230a), and generating charging state information and periodically records the information while monitoring the charging state of the battery BAT; and a protection circuit unit (240) coupled between the charging control unit (230) and the battery (BAT) to control whether to perform charging or discharging depending on a charged state of the battery (BAT).

A shield plate (260) having a film shape is interposed between the secondary core unit (210) of the battery pack (B) and a battery case (250), and the protection circuit unit (240) is surrounded by a shield member (241).

The charging control unit (230) is formed by integrating circuits optimized to perform both a charging control function of controlling the charging and discharging of the battery (BAT) using the power rectified by the secondary rectification circuit (200), and a fuel gauge function of generating the charge state information and periodically recording the generated information while monitoring the charging state of the battery (B).

The foreign object detection unit (220) detects instantaneous power at the same time that the batter pack (B) containing the secondary core unit (210) is placed on the wireless charger (A) and allows a no load state to be maintained by maintaining a switch (Q3) in an OFF state for a certain period of time, and allows the no load state to be switched into a load state by maintaining the switch (Q3) in an ON state after the no load state has been maintained for the period of time, thereby informing the primary coil through load modulation that the battery pack (B) containing the secondary core unit (210) has been placed on the non-contact charger (A) and, at the same time, applying power to a charging control unit (230).

ADVANTAGEOUS EFFECTS

In accordance with the present invention, components for detecting a portable terminal, a battery pack or a foreign object that is placed on the pad of a non-contact charger, and effectively monitoring and controlling its charging state through the detection are added, so that the efficiency of the entire circuit is improved, and the foreign object can be prevented from being heated by induction heating.

Furthermore, a function of sterilizing a terminal is provided to a non-contact charging pad and also anions are generated therefrom, so that the terminal can be sanitarily used and nearby ambient air thereof can be kept fresh.

Furthermore, a primary core unit included in a non-contact charging pad is provided in a form such that the center portion thereof may be passed through, so that the structure thereof is simplified, charging is available at a defined location and, therefore, the usage efficiency thereof can be increased.

DESCRIPTION OF DRAWINGS

FIG. 1 is a block diagram showing the construction of a non-contact charging system according to the present invention;

FIGS. 2 and 3 are perspective views showing a primary core unit disposed in the non-contact charging system according to the present invention;

FIGS. 4, 5 and 6 are perspective views showing the use of the primary core unit disposed in the non-contact charging system according to the present invention;

FIG. 7 is a view showing a direction of rotation of a magnetic field depending on each mode of operation in a series resonance type converter provided in the non-contact charging system according to the present invention;

FIG. 8 is a perspective view showing the construction of a battery pack provided in the non-contact charging system according to the present invention;

FIG. 9 is a diagram illustrating an algorithm that executes when a battery pack, in which a secondary core unit is contained, is placed on the non-contact charging system according to the present invention;

FIG. 10 is a diagram illustrating an algorithm that execute when a foreign object made of metal is placed on the non-contact charging system according to the present invention; and FIG. 11 is a diagram illustrating the algorithm and state of the non-contact charging system according to the present invention.

BEST MODE

An embodiment of the present invention is described in detail with reference to the accompanying drawings below.

When it is determined that details of well-known functions or constructions related to descriptions of the present invention may unnecessarily make the gist of the present invention unclear, the details will be omitted.

FIG. 1 is a block diagram showing the construction of a non-contact charging system according to the present invention.

The non-contact charging system according to the present invention includes a battery pack B charged by an induced electromotive force that is generated in a non-contact charger A supplied with power.

The non-contact charger A, as shown in FIG. 1, blocks electromagnetic waves caused by Alternating Current (AC) power (110/220V) input using an electromagnetic wave filter 100 that is connected to the power input terminal of a wireless charging pad, and a primary rectification circuit 110 rectifies the AC power, the electromagnetic waves of which are blocked, to create DC power. A flyback converter 110' contains a transistor, stores power transferred from the primary rectification circuit 110 while the contained transistor is turned on. In contrast, the flyback converter 110' simultaneously applies an input voltage to a gate driver 160, a central processing unit 180 and an ion generation unit 182 and a driving voltage to a series resonance type converter 120 when the contained transistor is turned off.

A current detection unit 170 is interposed between the flyback converter 110' and the series resonance type converter 120, detects variation in current resulting from the approach of the battery pack B, and outputs a comparison current depending on variation in the current.

For this purpose, the current detection unit 170 is connected to both ends of a resistor connected to the output terminal of the flyback converter 110' and the input terminal of the series resonance type converter 120, has a differential amplifier 171, to which signals output from both ends of the resistor are input, and a comparator/low-frequency filter 172, coupled to the output terminal of the differential amplifier 171. The current detection unit 170 detects variation in current by comparing the output voltage of the differential amplifier 171 with a predetermined reference voltage, filters out a comparison current depending on the amount of variation in current, and outputs the result.

The central processing unit 180 detects the approach of the battery pack B using the comparison current input from the current detection unit 170, controls the gate drive 160 depending not only on whether a battery pack B approaches but also on the current of a temperature protection circuit unit 183 for stopping the switching of the gate drive 160 when abnormal operation occurs or the temperature of a foreign object placed on the non-contact charging pad exceeds a predetermined temperature. Furthermore, the central processing unit 180 performs the determination of information fed back from a dust and odor sensor 181 and switches the operation mode of the ion generation unit 182.

The gate driver 160 outputs gate signals under the control of the central processing unit 180, and the series resonance type converter 120 adjusts the waveforms of voltage and current applied to the primary core unit 130 in response to the gate signals input from the gate driver 160.

For this purpose, the gate driver 160 allows two switching devices, which are provided in the series resonance type converter 120, to be alternately turned on in response to the gate signals output by the control of the central processing unit 180, and allows the waveforms of the input voltage and current to be adjusted by charging and discharging parallel capacitors coupled to respective switching devices.

The series resonance type converter 120 is configured to adjust the waveforms of the voltage and the current applied to the primary core unit 130 by the gate signals. The primary core unit 130 is configured to be switched by the series resonance type converter 120 and, therefore, generate an induced electromotive force.

FIGS. 2 and 3 are perspective views showing a primary core unit disposed in the non-contact charging system according to the present invention, and FIGS. 4, 5 and 6 are perspective views showing the use of the primary core unit disposed in the non-contact charging system according to the present invention.

As shown in the drawings, the primary core unit 130 is configured such that coils Pcoil1 and Pcoil2 are wound around a plate core member 131 in which a central opening 132 is formed, and is configured such that pieces of amorphous metal or ferrite material, such as Cobalt Co, Iron Fe, Nickel Ni, Boron B or Silicon Si, having high magnetic permeability (>80,000) and an unbroken characteristic, are attached thereto. Although the plate core member 131 is formed in a polygonal shape, it may be formed in either circular or elliptical shapes in addition to the polygonal shape. The central opening 132 is configured such that a function, which is capable both of reducing the amount of material used and of maximizing the area for radiating heat, is provided.

The coils Pcoil1 and Pcoil2 are configured to be wound around the plate core member 131 in series or in parallel, and it is preferable to use a single wire, a paired wire, a Litz wire or a copper foil. The start points of the coils Pcoil1 and Pcoil2 are formed by winding the coils in the same directions, and the ends of the coils Pcoil1 and Pcoil2 are configured to be matched with Lr and Lr', respectively, and to be switched using two series resonance type converters.

In this case, driven switching adjusts the phase of a signal Q1 and the phase of a signal Q2, thus inducing LC resonance, so that energy is stored in a secondary coil.

Furthermore, the switching patterns of the coils Pcoil1 and Pcoil2 are alternately generated, so that a magnetic field shown in FIG. 7 rotates 360°, and induced energy can be stored regardless of the location of the secondary coil wound in a single direction.

Meanwhile, when the primary core unit 130 having the construction shown in FIGS. 4 and 5 is placed on one or both sides of a circuit 134 and is then used, a plurality of portable terminals or battery packs may be charged at the same time, so that the efficiency thereof can be increased.

Furthermore, as shown in FIG. 6, primary core units 130 and 130' can be placed on one side of the circuit 134 in series or parallel.

In the battery pack B, as shown in FIG. 1, resonance is induced while power generated from the primary coil passes a resonance capacitor Cs through the coil Scoil1 of the secondary core unit 120, and a sinusoidal AC generated by the resonance is rectified into a Direct Current (DC) by the secondary rectification circuit 200.

Power rectified by the secondary rectification circuit 200 is supplied to a foreign object detection unit 220, and the supplied power is applied to a charging adjustment circuit 230a in response to the output of the foreign object detection unit 220.

In this case, the foreign object detection unit 220 detects power at the moment at which the battery pack B that contains the secondary core unit 210, that is, a secondary module, is placed on the non-contact charger A, and is maintained in a no load state (the current of the current detection unit is smaller than a no load reference value) by maintaining a switch Q3 in an OFF state for a predetermined time (several tens of ms). When a predetermined period of time has lapsed after the no load state, the foreign object detection unit 220 is switched into a load state (the current of the current detection unit is larger than the no load reference value) by maintaining the switch Q3 in an ON state, and informs the primary coil through load modulation that the battery pack B containing the secondary core unit 210 has been placed on the non-contact charger A and, at the same time, applies power to a charging control unit 230.

Subsequently, the current of the current detection unit 170 becomes smaller than the reference value of the no load state when the charging is completed and, at the same time, the secondary core unit 210 enters the no load state again, so that a fully-charging state is indicated by a Light Emitting Diode (LED) or a Liquid Crystal Display (LCD).

The charging control unit 230 includes the charging adjustment circuit 230a and a fuel gauge 230b, and performs both charging adjustment and fuel gauge functions. The charging adjustment circuit 230a supplies the fuel gauge 230b with power rectified by the secondary rectification circuit 200, and applies voltage to a RFID control unit (not shown) in response to the output of the secondary rectification circuit 200. The fuel gauge 230b supplies a battery BAT through a protection circuit 240 with power supplied from the charging adjustment circuit 230a, generates charging state information and periodically records the information in the RFID control unit (not shown) while monitoring the charging state of the battery BAT. The protection unit is coupled between the charging control unit 230 and the battery BAT, and adjusts the charging and discharging of the battery BAT depending on whether the battery BAT is to be charged or discharged.

In the RFID control unit (not shown), the RFID information of the battery BAT is stored and, at the same time, the charging state information is periodically recorded. When receiving an RF carrier, the RFID control unit generates RFID data, including the stored RFID and charging state information of the battery BAT, in response to the received RF carrier, modulates the RFID data, and wirelessly transmits the modulated RFID data through a tag antenna. The battery BAT is charged depending on the adjustment of the protection circuit unit 240.

The charging control unit 230 is formed by integrating circuits optimized to perform both the charging control function of controlling the charging and discharging of the battery BAT using the power rectified by the secondary rectification circuit 200, and the fuel gauge function of generating the charge state information and periodically recording the generated information while monitoring the charging state of the battery B.

FIG. 8 is a perspective view showing the construction of the battery pack provided in the non-contact charging system according to the present invention. As shown in FIG. 8, the battery pack B is configured such that a shield plate 260 having a film shape is interposed between the secondary core unit 210 and a battery case 250, thus preventing the temperature of the battery BAT from increasing due to an induced electromotive force generated by the induction of an electromagnetic field and, therefore, enhancing the stability of the battery pack B, and is also configured such that sufficient electromotive force is generated by reducing the interference of the electromagnetic field caused by the induced electromotive force, thus enhancing the charging rate.

Furthermore, when a shield member 241 that is capable of blocking the electromagnetic field is provided so as to surround the protection circuit unit 240, it is prevented from affecting different components provided inside the protection circuit unit 240. The shield member 241 is formed in a box form so as to surround the protection circuit unit 240. It is preferred that the entire protection circuit unit 240 is formed by molding.

An example of a process of charging the battery pack B using the wireless charging pad is described with reference to FIGS. 9 to 11 below.

FIG. 9 is a diagram illustrating an algorithm that executes when a battery pack, in which a secondary core unit is contained, is placed in the non-contact charging system according to the present invention. FIG. 10 is a diagram illustrating an algorithm that executes when a foreign object, which is made of metal, is placed on the non-contact charging system according to the present invention. FIG. 11 is a diagram illustrating the algorithm and states of the non-contact charging system according to the present invention.

First, the foreign detection unit 220 detects instantaneous power at the same time that a battery pack B is placed on the wireless charging pad, and allows a no load state to be maintained by maintaining the switch Q3 in an OFF state for a certain period of time.

Thereafter, the foreign detection unit 220 maintains the state at which the current of the current detection unit 170 becomes smaller than the no load reference value for the period of time, and then allows the no load state to be switched into a load state by maintaining the switch Q3 in an ON state. At this time, the current of the current detection unit 170 becomes larger than the no load reference value, so that the foreign object detection unit 220 informs the primary coil through load modulation that a battery pack B containing a secondary core unit 210 has been placed on the non-contact charger A and, at the same time, applies power to the charging control unit 230.

Thereafter, the current of the current detection unit 170 becomes smaller than the reference value of the no load state when the charging is completed and, at the same time, the secondary core unit 210 enters the no load state, so that a fully-charging state is indicated by a LED or a LCD.

Meanwhile, the power is applied to the charging control unit 230, and the operation mode of the ion generation unit 182 is switched by allowing the central processing unit 180 to determine information fed back from the odor sensor 181, so that a plurality of ions generated by the ion generation unit 182, are spread to the area around the wireless charging pad. Accordingly, the bacteria on the battery pack can be destroyed and, at the same time, the ambient air near the wireless charging pad can be purified.

Meanwhile, the switch Q3 is maintained in an OFF state for a certain period of time and the no load state is maintained by detecting instantaneous power at the same time that a batter pack B is placed on the wireless charging pad, and a current below the reference value is supplied and is then blocked by the central processing unit 180 to which the currents of the current detection unit 170 and the temperature protection circuit unit 183 are applied, so that damage caused by overheating is prevented.

The above-described present invention can be variously modified according to the demand of those skilled in the art within the range without departing from the fundamental concept of the present invention.

The invention claimed is:

[1. A non-contact charging system having a battery pack (B) charged by an induced electromotive force generated from a non-contact charger (A) supplied with power, wherein the non-contact charger (A) comprises: an electromagnetic wave filter (100) connected to a power input terminal to block electromagnetic waves caused by Alternating Current (AC) power; a primary rectification circuit (110) for rectifying the AC power, to Direct Current (DC) power, a flyback converter (110') for storing power transferred from the primary rectification circuit (110) while a contained transistor is turned on, and applying an input voltage to a gate driver (160), a central processing unit (180) and applying a driving voltage to a series resonance type converter (120) when the contained transistor is turned off; a current detection unit (170) interposed between the flyback converter (110') and the series resonance type converter (120) to detect a variation in current resulting from an approach of the battery pack (B) to a non-contact charging pad, and outputting a comparison current depending on the variation in current; the central processing unit (180) for detecting the approach of the battery pack (B) using the comparison current output from the current detection unit (170), controlling the gate drive (160) according not only to whether the battery pack (B) approaches but also to the current of a temperature protection circuit unit (183) to stop the switching of the gate drive (160) when abnormal operation occurs or the temperature of a foreign object placed on the non-contact charging pad exceeds a predetermined temperature; the gate driver (160) for outputting gate signals under the control of the central processing unit (180); the series resonance type converter (120) for adjusting the waveforms of voltage and current applied to a primary core unit (130) in response to the gate signals input from the gate driver (160); and the primary core unit (130) switched by the series resonance type converter (120) to generate the induced electromotive force, wherein the battery pack (B) comprises:

a secondary core unit (210) configured to induce power through the primary core unit (130); a secondary rectification circuit unit (200) coupled to a coil (Scoil1) of the secondary core unit (120) to rectify the induced power; a charging control unit (230) comprising a charging adjustment circuit (230a) for supplying a fuel gauge (230b) with power rectified by the secondary rectification circuit (200), and applying voltage to a Radio Frequency Identification (RFID) control unit in response to the output of the secondary rectification circuit (200), and the fuel gauge (210b) for supplying a battery BAT through a protection circuit (240) with power supplied from the charging adjustment circuit (230a), and generating charging state information and periodically records the information while monitoring the charging state of the battery BAT; and a protection circuit unit (240) coupled between the charging control unit (230) and the battery (BAT) to control whether to perform charging or discharging depending on a charged state of the battery (BAT), and a shield plate (260) having a film shape, interposed between the secondary core unit (210) of the battery pack (B) and a battery case (250), the protection circuit unit (240) being surrounded by a shield member (241).]

[2. The non-contact charging system according to claim 1, wherein the gate driver (160) allows two switching devices, which are provided in the series resonance type converter (120), to be alternately turned on in response to the gate signals output under control of the central processing unit (180), thus adjusting the waveforms of the input voltage and current through charging and discharging parallel capacitors coupled to respective switching devices.]

[3. The non-contact charging system according to claim 1, wherein the current detection unit (170) is connected to both ends of a resistor connected to an output terminal of the flyback converter (110') and an input terminal of the series resonance type converter (120), comprises a differential amplifier (171) to which signals output from both ends of the resistor are inputted, and a comparator/low frequency filter (172) which is coupled to an output terminal of the differential amplifier (171), and detects the variation in current by comparing the output voltage of the differential amplifier (171) with a predetermined reference voltage, filters out the comparison current depending on variation in current, and outputs the comparison current.]

[4. The non-contact charging system according to claim 1, wherein the central processing unit (180) is configured to process information fed back from a dust and odor sensor (181) and switch an operation mode of the ion generation unit (182).]

[5. The non-contact charging system according to claim 1, wherein the primary core unit (130) is configured such that coils (Pcoil1 and Pcoil2) are wound around a plate core member (131) in which a central opening (132) is formed.]

[6. The non-contact charging system according to claim 5, wherein the plate core member (131) is formed in a polygonal shape, a circular shape, or elliptical shape, and is configured such that pieces of amorphous metal or ferrite material are attached thereto.]

[7. The non-contact charging system according to claim 5, wherein the coils (Pcoil1 and Pcoil2) are wound around the plate core member (131) in series or in parallel.]

[8. The non-contact charging system according to claim 1, wherein the charging control unit (230) is formed by integrating circuits optimized to perform both a charging control function of controlling the charging and discharging of the battery (BAT) using the power rectified by the secondary rectification circuit (200), and a fuel gauge function of generating the charge state information and periodically recording the generated information while monitoring the charging state of the battery (B).]

[9. The non-contact charging system according to claim 1, wherein the foreign object detection unit (220) detects instantaneous power at the same time that the battery pack (B) containing the secondary core unit (210) is placed on the wireless charger (A) and allows a no load state to be maintained by maintaining a switch (Q3) in an OFF state for a certain period of time, and allows the no load state to be switched into a load state by maintaining the switch (Q3) in an ON state after the no load state has been maintained for the period of time, thereby informing the primary coil through load modulation that the battery pack (B) containing the secondary core unit (210) has been placed on the non-contact charger (A) and, at the same time, applying power to a charging control unit (230).]

*10. An electronic device for use with a wireless power transmitter having a primary coil for transmitting wireless power, the electronic device comprising:*

*a secondary coil configured to receive wireless power via an electromagnetic field induced by the primary coil of the wireless power transmitter;*

*a rectification unit coupled to the secondary coil and configured to rectify the wireless power to generate rectified power;*

*a shielding that is interposed between the wireless power receiving coil and a battery of the electronic device, wherein the shielding is configured to reduce interference to the electronic device caused by the electromagnetic field that would otherwise exist without the shielding; and*

*a control unit that controls a switch for transferring the rectified power to a power system of the electronic device, the control unit configured to manage a load state of the electronic device,*

*wherein the load state is managed by maintaining the switch in an 'OFF' state to disable the transfer of the rectified power or changing the switch to the 'ON' state to enable the transfer of the rectified power, and*

*wherein the control unit uses load modulation to transmit an information signal that identifies the electronic device containing the secondary coil.*

*11. The electronic device according to claim 10, wherein the control unit maintains the switch in the 'OFF' state for a predetermined period after detecting a first power.*

*12. The electronic device according to claim 11, wherein the predetermined period is several tens of milliseconds.*

*13. A method performed by an electronic device for use with a wireless power transmitter having a primary coil for transmitting wireless power, the method comprising:*

*receiving, by a secondary coil of the electronic device, wireless power via an electromagnetic-field induced by the primary coil of the wireless power transmitter;*

*rectifying, by a rectification unit coupled to the wireless power receiving coil, the wireless power to generate rectified power;*

*shielding a battery in the electronic device using a shielding that is interposed between the wireless power receiving coil and the battery, wherein the shielding is configured to reduce interference to the electronic device caused by the electromagnetic field that would otherwise exist without the shielding; and*

*controlling, by a control unit of the electronic device, a switch for transferring the rectified power to a power system in the electronic device;*

*wherein the controlling of the switch includes:*

*managing a load state of the electronic device by maintaining the switch in an 'OFF' state to disable the transfer of the rectified power or changing the switch to the 'ON' state to enable the transfer of the rectified power, and*

*using load modulation via the secondary coil to transmit an information signal that identifies the electronic device containing the secondary coil.*

*14. The method according to claim 13, wherein the switch in the 'OFF' state is maintained for a predetermined period after detecting a first power.*

*15. The method according to claim 14, wherein the predetermined period is several tens of milliseconds.*

*16. The electronic device according to claim 10, wherein the power system includes at least the battery for storing the rectified power.*

*17. The electronic device according to claim 10, wherein the control unit uses load modulation to inform the wireless power transmitter that the electronic device containing the secondary coil has been placed on primary coil of the wireless power transmitter.*

*18. The electronic device according to claim 10, wherein the information signal enables the wireless power transmitter to determine that the electronic device containing the secondary coil has been placed on the primary coil of the wireless power transmitter.*

*19. The method according to claim 13, wherein controlling the switch includes using load the modulation to inform the wireless power transmitter that the electronic device containing the secondary coil has been placed on primary coil of the wireless power transmitter.*

*20. The method according to claim 13, wherein the information signal enables the wireless power transmitter to determine that the electronic device containing the secondary coil has been placed on the primary coil of the wireless power transmitter.*

* * * * *